Figure 1:
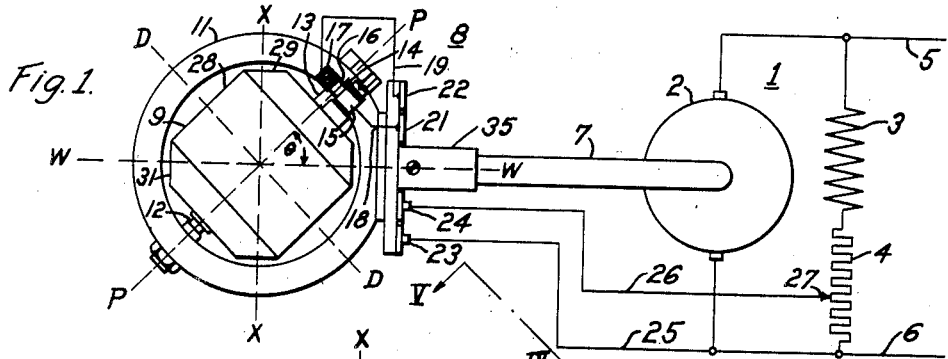

Feb. 6, 1940.  C. R. HANNA ET AL  2,189,634
SPEED GOVERNOR
Filed Sept. 16, 1937   2 Sheets-Sheet 1

WITNESSES:
Wm. B. Sellers.
F. E. Hardy

INVENTORS
Clinton R. Hanna and
Stanley J. Mikina.
BY Ezra W. Savage
ATTORNEY

Feb. 6, 1940.  C. R. HANNA ET AL  2,189,634
SPEED GOVERNOR
Filed Sept. 16, 1937    2 Sheets-Sheet 2
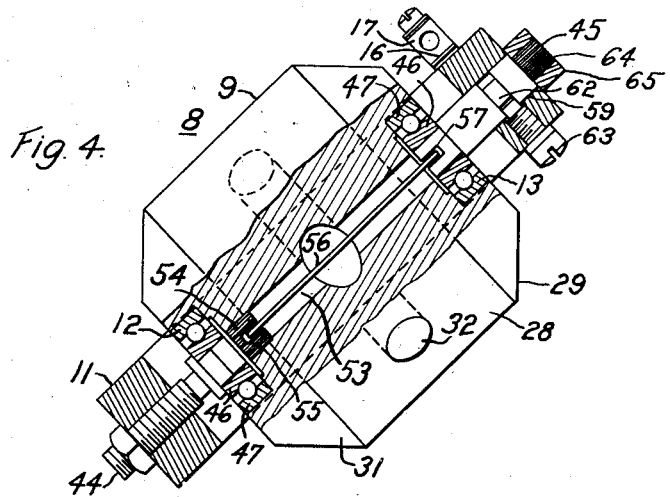
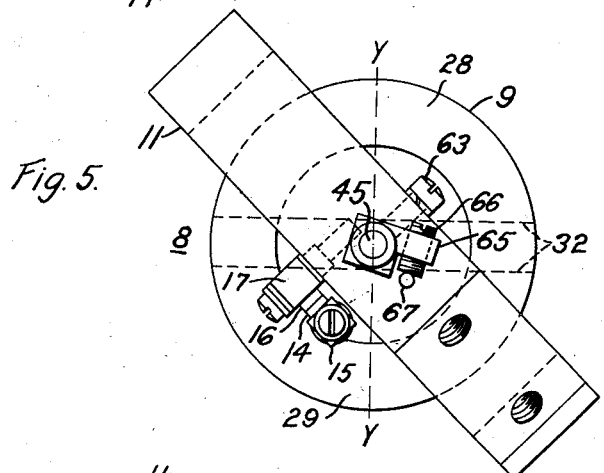
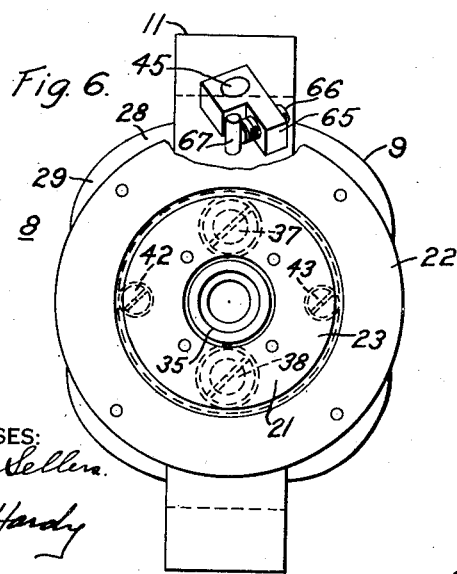
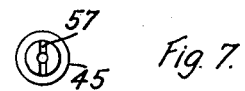
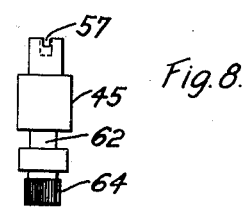
WITNESSES:
INVENTORS
Clinton R. Hanna and
Stanley J. Mikina.
ATTORNEY Patented Feb. 6, 1940

2,189,634

UNITED STATES PATENT OFFICE 2,189,634

SPEED GOVERNOR

Clinton R. Hanna and Stanley J. Mikina, Wilkinsburg, Pa., assignors to Westinghouse Electric & Manufacturing Company, East Pittsburgh, Pa., a corporation of Pennsylvania Application September 16, 1937, Serial No. 164,160

12 Claims. (Cl. 175—355)

Our invention relates to centrifugal speed governors for governing the speed of devices, such as prime movers, motors, etc.

Speed regulators of the centrifugal type usually possess hunting characteristics caused by the necessity of an appreciable departure in the speed of the regulated device from its desired value before a corrective force is established of sufficient intensity to develop the necessary corrective action, and the inability of this corrective force, once it is established, to discontinue its influence prior to a completion of the correction.

In such regulators, the accuracy of regulation may be greatly improved if the speed controlling mechanism is responsive not only to variations in the speed of the regulated device from its desired value, but also to the changes in acceleration that accompany and anticipate such speed changes, and which occur as the speed of the regulated member starts away from its desired value. The acceleration force accompanying such speed changes may become effective before any substantial change in speed has occurred and may, therefore, be employed to introduce a corrective influence into the regulator system earlier than would be the case if the regulator responded to speed variations only.

A hovering contact speed regulator of the single inertia member type wherein a rotor is pivoted about an axis inclined to the axis of rotation so as to be responsive both to speed and to acceleration is described and claimed in a copending application of Clinton R. Hanna for Speed regulators, Serial No. 164,158, filed September 16, 1937, and assigned to the same assignee as this application. In speed regulators of this type, it is desirable that the inertia member or rotor be so proportioned and mounted as to reduce to a minimum the loading on its bearings due to centrifugal force unbalance, and to minimize the vibrations caused by such unbalance. A rotor has been developed in which the desired proportions are secured with the least possible restrictions as to its form, thus facilitating its manufacture to precise dimensions and its accurate mounting within a rigid frame support that is subject to the least possible vibration and deformity. In addition to the simplification of the rotor and its mounting, an improved type of speed calibrating spring and mounting are provided, the calibration of which is unaffected by centrifugal force acting on the spring.

It is an object of our invention to provide a centrifugal speed regulator of the single inertia member type wherein the rotor is mounted with one degree of freedom of movement about an axis at an angle to the axis of rotation in which the rotor shape and mounting is simplified.

It is a further object of our invention to provide a speed regulator of the above-indicated character in which the speed calibrated spring, its mounting and adjusting means are simplified.

Figure 2:
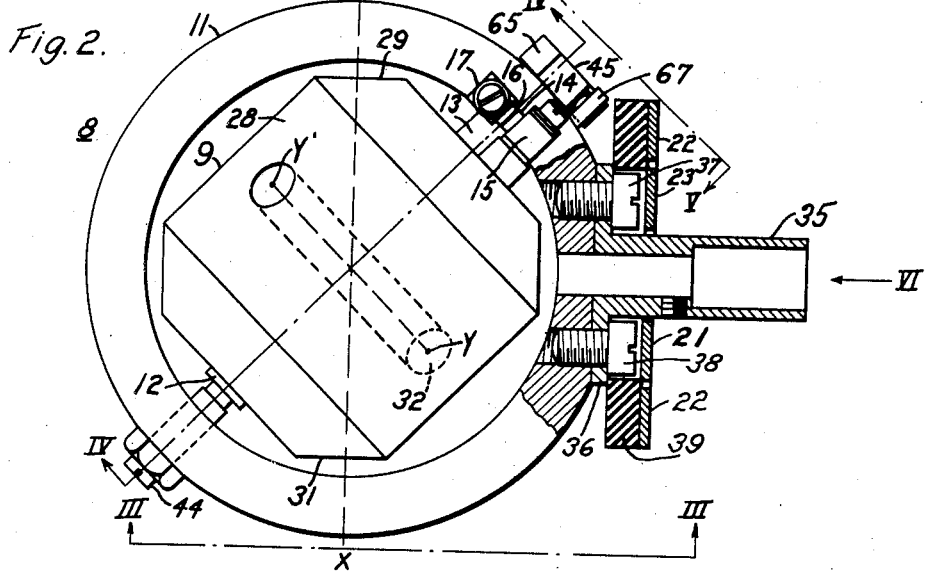
Figure 3:
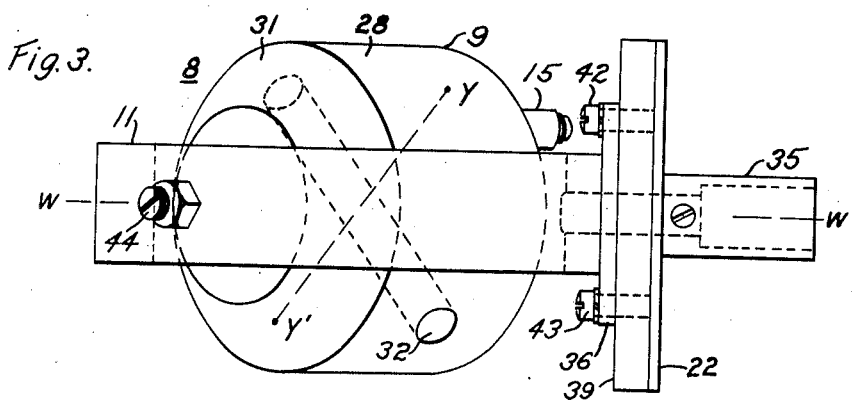

Other objects and advantages of the invention will appear from the following description of one preferred embodiment thereof, reference being had to the accompanying drawings, in which Figure 1 is a diagrammatic view of an embodiment of the invention, parts thereof being shown in elevation, Fig. 2 is an enlarged view partly in side elevation and partly in section of the regulator illustrated in Fig. 1, Fig. 3 is a bottom view of the rotor and supporting ring, as indicated by the dash and dot line III—III in Fig. 2, Fig. 4 is a view, mainly in section, along the line IV—IV in Fig. 2, Fig. 5 is a view of the rotor and supporting ring taken in the direction indicated by the dot and dash line V—V of Fig. 2, with parts removed, Fig. 6 is a view of the rotor and supporting ring taken in the direction indicated by the arrow VI in Fig. 2, and, Figs. 7 and 8 are details showing the spring adjusting stud.

Referring to Figure 1, a prime mover 1 is illustrated as an electric motor having an armature winding 2 and a field winding 3 that is connected in series with a field controlling resistor 4 and supplied with electrical energy from a source represented by the conductors 5 and 6. The motor is provided with a shaft 7 upon which is mounted a speed governor indicated generally at 8 comprising a rotor or inertia element 9 mounted within a supporting ring frame 11 by means of bearings 12 and 13 that are aligned along an axis P—P passing through the center of mass of the rotor at an angle $\theta$ to the axis of rotation W—W, which also passes through the center of mass of the rotor 9. A contact member 14 is carried by a stud 15 mounted on the rotor 9 and adapted to engage a contact member 16 carried by a stud 17 mounted on the supporting ring frame 11. The contact members 14 and 16 are connected, respectively, by conductors 18 and 19 to collector rings 21 and 22 that are engaged by brushes 23 and 24 that are connected by conductors 25 and 26, respectively, to the lower end of the resistor 4 and to the movable contact member 27, to control the effective value of the field resistor 4 between the movable contact members 27 and the lower end of the resistor.

If we consider a rotor of a perfectly general shape with its center of gravity on the axis of rotation and on a pivot axis making an angle $\theta$ with the axis of rotation as shown in Fig. 1, it can be shown by calculation that the centrifugal torque tending to increase the angle $\theta$ is given by the equation $T = (I_D - I_P) w^2 \sin \theta \cos \theta$, where $I_D$ = moment of inertia of the rotor about an axis D—D perpendicular to the pivot axis, $I_P$ = polar movement of inertia of the rotor about the pivot axis P—P, and $w$ = angular velocity about rotational axis.

From this it follows that by making $I_D$ equal to $I_P$, the torque loading on the pivot axis bearings is reduced to zero and the rotor is dynamically balanced for any pivot axis inclination.

The rotor design disclosed in this application is developed in conformity with the above equation. The pivot axis P—P has been made an axis of rotational symmetry to facilitate manufacture. The rotor 9 is so constructed that its outer elements form a cylinder 28 and two truncated cone surfaces 29 and 31 that are so chosen as to utilize to the best advantage the space within the ring supporting frame 11. This frame is substantially circular in construction which provides the best shape against deformity due to the centrifugal forces of the ring when revolved about the axis W—W. In order to provide the completely balanced rotor corresponding to the above-indicated formula, with the necessary amount of unbalance for producing a couple that is responsive to the centrifugal force about the axis W—W to sense the speed at which the rotor is revolved, it is necessary either to add weights, as disclosed in the above-named application, Serial No. 164,158 filed Sept. 16, 1937, or, as herein disclosed, to effect the equivalent result by drilling a hole 32 through the center of mass of the rotor which removes material from the rotor along the axis of the bore and produces the equivalent effect of adding weights to the end of an axis Y—Y' that is at right angles to the bore 32, the axis Y—Y' passing through the center of mass.

In the position of the rotor shown in Fig. 2, the axis Y—Y' is in the plane of the axis of the bore 32, each being at 45° to the plane of the paper on opposite sides thereof or at 90° to each other as clearly shown in Fig. 5.

Referring to Fig. 2, the frame 11 is mounted on the shaft 7 by means of a sleeve 35 having a flange 36 attached to the ring 11 by screws 37 and 38, which also hold an insulating disc 39 in place upon which the collector rings 22 and 23 are mounted. Terminal studs 42 and 43, shown in Fig. 3, are provided by means of which the conductors 18 and 19 may be connected to the collector rings 22 and 23, respectively.

The rotor 9 is provided with ball bearings 12 and 13, best shown in Fig. 4, having inner races 46 supported on bearing studs 44 and 45, respectively, that are carried by the ring 11 and outer races 47 being mounted within a depression in the roller 9.

A bore 53 is provided coincident with the pivot or bearing axis of the rotor 9 in one end of which is pressed a knurled member 54 to rigidly attach it to the rotor 9. The member 54 is provided with a slot 55 for accommodating one end of a flat torsion spring 56, the other end of which fits into a slot 57 in one end of the stud 45 upon which the inner race 46 of the ball bearing 13 is mounted. The stud 45 extends through a bore 59 in the supporting ring frame 11 in which it is free to rotate and is provided with a portion 62 of decreased diameter forming shoulders between which the inner end of a screw 63 is inserted through a bore in the wall of the ring 11 to prevent longitudinal movement of the stud 45. The outer end of the stud 45 is provided with a knurled portion 64 on which is tightly fitted a crank arm 65, best shown in Figs. 5 and 6, through the outer end of which a screw threaded bore is provided for accommodating a set screw 66, one end of which engages a pin 67 carried on the supporting ring 11. The desired tension on the spring 56 is provided by turning the set screw 66 against the pin 67 to move the stud 45 angularly against the bias of the flat torsion spring 56. It will be appreciated that by placing the torsion spring through a bore coincident with the pivotal axis of the rotor with its flat side in the plane determined by the pivot axis and the axis of rotation, the calibrated setting of the spring as well as the system balance are not affected by the spring distortion which would otherwise occur due to the action of centrifugal force on the spring.

Assume that the tension of the spring 56 has been set by turning the set screw 66 inwardly in its screw threaded bore within the arm 65 so that in pressing against the spring 67, the arm 65 is given a counterclockwise movement as viewed in Fig. 5 to create a bias on the rotor 9 in a corresponding direction, and urge the contact member 14 away from engagement with the contact member 16 an amount determined by the setting of the screw 66. If now the motor 1 is driven in a direction such that the top of the ring 11, as viewed in Figs. 1 and 2, is moved toward the reader and the bottom of the ring 11 is moved away from the reader, corresponding to a counterclockwise direction of motion as viewed in Fig. 6, a couple is formed tending to rotate the rotor 9 about the axis X—X, (Figs. 1 and 2) which has component about the pivot axis P—P in a direction to move the element of the rotor nearest the reader upwardly toward the left or in a direction to cause the contact member 14 carried by the rotor to engage the contact member 16 carried by the ring. This couple is caused by the elimination of material in the bore 32 which, in effect, concentrates weight along an axis at right angles to the axis of the bore 32 or along the axis Y—Y'. It will be noted that centrifugal forces acting at the points along the axis Y—Y' as viewed in Fig. 3, causes the end Y of the axis to be moved upwardly and the end Y' to be moved downwardly away from the axis of rotation W—W. This causes a couple about the axis X—X which in Fig. 3 is at right angles to the plane of the paper.

Referring to Fig. 2, it will be appreciated that the point Y is on the near side of the rotor and tends to move about the axis X—X toward the reader while the point Y' is on the far side of the rotor and tends to move away from the reader, thus moving the rotor 9 in a clockwise direction, as viewed in Fig. 5, or in a direction to cause engagement of the contact member 14 carried by the rotor with the contact member 16 carried by the ring 11. The force of this centrifugal couple increases with the increased speed at which the motor 1 is driven until it becomes sufficient to cause engagement of the contact members 14 and 16 to short circuit that portion of the resistor 4 between the adjustable contact member 27 and the conductor 6 to thereby increase the strength of the field winding 3 and decrease the speed of the motor 1.

In the explanation thus far given, we have considered only the effect of the centrifugal force which produces a moment about the axis X—X having a component about the pivot axis P—P. Let us assume that the motor 1 is revolving at its desired speed and that the speed increases somewhat. This increase in motor speed will correspondingly increase the speed of rotation of the ring 11 about the axis W—W. The inertia of the rotor 9 about the axis W—W resists an immediate corresponding change in speed, thus developing an inertia torque about the axis W—W that has a component about the axis P—P in a direction to increase the pressure between the contact members 14 and 16, to thereby short circuit the lower portion of the resistor 4 sooner than would be the case if the rotor were acted upon by centrifugal force alone. It will be appreciated that the inertia torque of acceleration about the axis W—W and the centrifugal torque about the axis X—X each develop components of torque about the pivot axis P—P tending to move the rotor in the same direction against the bias of the spring 56 to cause engagement of the contact members 14 and 16. It will also be appreciated that the inertia torque of deceleration acts in the opposite direction to separate the contact member 14 from the contact member 16 earlier than would be the case were the rotor 9 responsive to centrifugal force alone.

Although for purposes of simplicity, the above description has taken into consideration the effect of variations in speed away from the desired value, it will be appreciated that in this type of regulator slight changes in speed above and below the desired value are continuously taking place sufficient to cause an intermittent engagement and separation of the contact members 14 and 16 to produce an effective value of the resistor 4 determined by the ratio of time of engagement to time of separation of the contacts, and that as the speed of the motor 1 varies from its desired value in the one or the other direction, the average pressure between the contacts 14 and 16 is changed in a direction to increase or decrease the proportional time during which these contacts are in engagement to thereby effect the appropriate change in the effective value of the resistor 4 to maintain the desired speed.

It will be appreciated by those skilled in the art that variations in the details of construction from those illustrated and described may be made within the spirit of our invention, and we do not wish to be limited other than by the scope of the appended claims.

We claim as our invention:

1. In a speed regulator, in combination, a member to be regulated, a supporting ring mounted to revolve at a speed that varies in accordance with the speed of the member to be regulated, a rotor pivotally mounted within said ring to move about an axis that is inclined at an angle to the axis of rotation, said rotor having a bore coincident with the pivot axis, a spring within said bore one end of which is attached to said ring for biasing said rotor about said pivot axis, the mass of said rotor being so distributed as to provide a couple of unbalance responsive to centrifugal force for biasing said rotor about its pivot axis against the bias of said spring, a contact member carried by said rotor and a cooperating contact member carried by said ring, and means controlled by said contact members.

2. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor having a bore coincident with the pivot axis, a flat torsion spring extending through said bore having one end attached to the rotor and the other end attached to an adjusting member mounted on the ring for adjusting the force of the spring, the mass of said rotor being so distributed as to provide a couple of unbalance responsive to the centrifugal force of revolution about the axis of rotation for biasing said rotor about its pivot axis against the bias of said spring, the direction of rotation of said ring and rotor about the axis of rotation being chosen such that the torque of angular acceleration of the rotor will be in a direction to oppose the bias of said spring, a contact member carried by said ring, and means controlled by said contact members.

3. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor having a bore through the center of mass thereof at an angle to the axis of rotation to provide an unbalance of the rotor mass which causes a couple to be produced by the centrifugal force of rotation about the said axis of rotation, which couple acts about an axis at right angles to the axis of rotation, biasing means for opposing the movement of the rotor about its pivot axis in response to centrifugal force, and means responsive to the movement thereof.

4. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor having a bore through the center of mass thereof at an angle to the axis of rotation to provide an unbalance of the rotor mass which causes a couple to be produced by the centrifugal force of rotation about the said axis of rotation, which couple acts about an axis at right angles to the axis of rotation, the direction of rotation of said rotor about the axis of rotation being chosen such that the torque of angular acceleration of the rotor will be in a direction to aid the torque of centrifugal force in moving the rotor about its pivot axis against the bias of said spring a contact member carried by said motor and a cooperating contact member carried by said ring, and means controlled by said contact members.

5. In a speed regulator, in combination, a member to be regulated, a supporting ring therefor mounted to revolve at a speed that varies in accordance with the speed of the member to be regulated, a rotor mounted within said ring having freedom of motion about a pivot axis inclined to the axis of rotation, said rotor being so designed that its moment of inertia about an axis through its center of mass at right angles to the pivot axis is substantially equal to the moment of inertia of the rotor about its pivot axis except for an unbalance along an axis at an acute angle to the axis of revolution for developing a couple due to the centrifugal force of rotation for biasing the rotor about its pivot axis, biasing means for opposing the movement of the rotor about its pivot axis in response to centrifugal force, and means responsive to the movement thereof.

6. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor being so designed that its moment of inertia about an axis through its center of mass at right angles to the pivot axis is substantially equal to the moment of inertia of the rotor about its pivot axis except for an unbalance along an axis at an acute angle to the axis of rotation for developing a couple due to the centrifugal force of rotation for biasing the rotor about its pivot axis, said rotor having a bore coincident with its pivot axis, a flat torsion spring contained therein, one end being connected to the rotor and the other end to the supporting ring for biasing the rotor about its pivot axis in opposition to the centrifugal force, the direction of rotation of said supporting ring and rotor about the axis of rotation being chosen such that the torque of angular acceleration of the rotor will be in a direction to aid the torque of centrifugal force in opposing the bias of said spring, a contact member carried by said rotor and a cooperating contact member carried by said ring, and means controlled by said contact members.

7. In a speed regulator, in combination, a member to be regulated, a supporting ring mounted to revolve at a speed that varies in accordance with the speed of the member to be regulated, a rotor mounted within said ring having freedom of motion about a pivot axis inclined at an angle of substantially 45° to the axis of rotation and positioned with its center of mass coincident with the axis of rotation, said motor having a bore coincident with the pivot axis, a flat torsion spring extending along said bore having one end attached to the rotor and the other end attached to an adjusting member mounted on the ring for adjusting the force of the spring, said rotor being of such shape that the boundary elements thereof formed the intersection with a plane passed through the pivot axis are straight lines, the mass of said rotor being so distributed as to provide a couple of unbalance responsive to the centrifugal force of revolution about the axis of rotation for biasing said rotor about its pivot axis against the bias of said spring, the direction of rotation of said supporting ring and rotor about the axis of rotation being chosen that the torque of angular acceleration of the rotor will be in a direction to aid the torque of centrifugal force in moving the rotor about its pivot axis against the bias of said spring, and means controlled by said movement.

8. In a speed regulator, in combination, a member to be regulated, a supporting ring therefor mounted to revolve at a speed that varies in accordance with the speed of the member to be regulated, a rotor mounted within the ring to possess an axis of freedom of motion, said rotor being so designed that its moment of inertia about an axis through its center of mass at right angles to the axis of freedom is substantially equal to the moment of inertia of the rotor about its axis of freedom except for an unbalance for establishing a centrifugal couple about the axis of rotation produced by a bore extending diametrically through the center of mass of the rotor transversely to the axis of freedom, and means responsive to movement of said inertia element about its axis of freedom.

9. In a speed regulator, in combination, a member to be regulated, a supporting ring mounted to revolve at a speed that varies in accordance with the speed of the member to be regulated, a rotor pivotally mounted within said ring to move about an axis that is inclined at an angle to the axis of rotation, said rotor having a bore incident with the pivot axis, a spring within said bore, one end of which is attached to said rotor and one end of which is attached to said ring for biasing said rotor about said pivot axis, the mass of said rotor being so distributed as to provide a couple of unbalance responsive to centrifugal force for biasing said rotor about its pivot axis against the bias of said spring, and a contact member controlled by said rotor.

10. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor having a bore coincident with the pivot axis, a flat torsion spring extending through said bore having one end attached to the rotor and the other end attached to an adjusting member mounted on the ring for adjusting the force of the spring, the mass of said rotor being so distributed as to provide a couple of unbalance responsive to the centrifugal force of revolution about the axis of rotation for biasing said rotor about its pivot axis against the bias of said spring, the direction of rotation of said ring and rotor about the axis of rotation being chosen such that the torque of angular acceleration of the rotor will be in a direction to oppose the bias of said spring, a contact member carried by said rotor and a cooperating contact member carried by said ring.

11. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor having a bore through the center of mass thereof at an angle to the axis of rotation to provide an unbalance of the rotor mass which causes a couple to be produced by the centrifugal force of rotation about the said axis of rotation, which couple acts about an axis at right angles to the axis of rotation, the direction of rotation of said rotor about the axis of rotation being chosen such that the torque of angular acceleration of the rotor will be in a direction to aid the torque of centrifugal force in moving the rotor about its pivot axis against the bias of said spring, and a contact member carried by said motor and a cooperating contact member carried by said ring.

12. In a speed regulator, in combination, a member to be regulated, a supporting ring mounted to revolve at a speed that varies in accordance with the speed of the member to be regulated, a rotor mounted within said ring having freedom of motion about a pivot axis inclined to the axis of rotation, said rotor being so designed that its moment of inertia about an axis through its center of mass at right angles to the pivot axis is substantially equal to the moment of inertia of the rotor about its pivot axis except for an unbalance along an axis at an acute angle to the axis of rotation for developing a couple due to the centrifugal force of rotation for biasing the rotor about its pivot axis, said rotor having a bore coincident with its pivot axis, a flat torsion spring contained therein, one end being connected to the rotor and the other end to the supporting ring for biasing the rotor about its pivot axis in opposition to the centrifugal force, the direction of rotation of said supporting ring and rotor about the axis of rotation being chosen such that the torque of angular acceleration of the rotor will be in a direction to aid the torque of centrifugal force in opposing the bias of said spring, a contact member carried by said rotor and a cooperating contact member carried by said ring.

CLINTON R. HANNA.
STANLEY J. MIKINA.